US012686838B2

(12) United States Patent
Fabrizio et al.

(10) Patent No.: US 12,686,838 B2
(45) Date of Patent: Jul. 21, 2026

(54) PROCESS AND SYSTEM FOR BREWING SOUR BEER

(71) Applicant: Artisanal Brewing Ventures, Charlotte, NC (US)

(72) Inventors: Mark Fabrizio, Downingtown, PA (US); Karen Brownell, Lititz, PA (US); Brittany Vegso, Malvern, PA (US)

(73) Assignee: Artisanal Brewing Ventures, Charlotte, NC (US)

( * ) Notice: Subject to any disclaimer, the term of this patent is extended or adjusted under 35 U.S.C. 154(b) by 556 days.

(21) Appl. No.: 18/168,763

(22) Filed: Feb. 14, 2023

(65) Prior Publication Data

US 2024/0084230 A1    Mar. 14, 2024

Related U.S. Application Data

(60) Provisional application No. 63/375,062, filed on Sep. 9, 2022.

(51) Int. Cl.
| | |
|---|---|
| *C12C 11/06* | (2006.01) |
| *C12C 7/04* | (2006.01) |
| *C12C 7/14* | (2006.01) |
| *C12C 7/20* | (2006.01) |

(52) U.S. Cl.
CPC ............... *C12C 11/06* (2013.01); *C12C 7/04* (2013.01); *C12C 7/14* (2013.01); *C12C 7/205* (2013.01)

(58) Field of Classification Search
CPC .. C12C 11/06; C12C 7/04; C12C 7/14; C12C 7/205
See application file for complete search history.

(56) References Cited

PUBLICATIONS https://coloradobeer.org/tech-safety-posts/the-basics-of-kettle-souring/#:~:text=This%20is%20easily%20down%20by,of%20tying%20up%20your%20kettle. The Basics of the Beer Souring May 17, 2018 (Year: 2018).*

* cited by examiner

*Primary Examiner* — Vera Stulii
(74) *Attorney, Agent, or Firm* — Myers Bigel, P.A.

(57) ABSTRACT

A process for brewing sour beer includes:
heating milled grain, water and enzymes to produce a mash; then
combining the mash with hot water to produce a wort; then
combining the wort with bioacid in a sour tank and heating the wort to produce a soured wort; then
transferring the soured wort to a kettle;
heating the soured wort in the kettle; then
removing particulate matter from the soured wort; then
transferring the soured wort to a cellar.

16 Claims, 2 Drawing Sheets

PROCESS AND SYSTEM FOR BREWING SOUR BEER

RELATED APPLICATION

The present application claims priority from and the benefit of U.S. Provisional Patent Application No. 63/375, 062, filed Sep. 9, 2022, the disclosure of which is hereby incorporated herein by reference in full.

FIELD OF THE INVENTION

The present invention is directed generally to brewing of beer, and more particularly to the brewing of sour beer.

BACKGROUND OF THE INVENTION

With the popularity of craft beers growing, brewers are looking for ways to diversify their products to appeal to individual tastes. One general variety of beer that has drawn attention recently is "sour" beer, which is beer with an intentionally acidic, tart or sour taste. Traditional sour beer styles include Belgian lambics, gueuze and Flanders red ale, German gose and Berliner Weisse.

A conventional sour beer brewing process (generally referred to as "kettle souring") is illustrated in FIG. 1. As an initial step, milled grain, water and enzymes are combined in a tank 12 (known as a "tun") to produce a mash (Block 10). The mash is transferred to a second tun 22, known as a lauter tun, where the mash is strained and sparged (which can be performed by adding water) to produce a wort (Block 20), with the spent grain being removed as waste. In some brewing arrangements, mashing and lautering can occur in the same tun. The wort is transferred to a kettle 32, where bioacid and $CO_2$ are added (Block 30). The wort and other ingredients are held (typically for 12-20 hours or more) to enable the bioacid to "sour" the wort. Once souring is complete, hops, dextrose and micronutrients are added, depending on the recipe, and the wort is boiled in the kettle. When the heating of the wort is complete, the soured wort is transferred to a whirlpool 42, wherein hops and other ingredients (such as an anti-foaming agent) may be added, and wherein some solids are removed as "trub" (Block 40). The wort is then transferred to a cellar 52 or other holding location for further processing (e.g., fermentation, bottling, etc.). It is common that the mash tun 12, the lauter tun 22, the kettle 32 and the whirlpool 42 are fluidly connected (e.g., via pipes, hoses, valves and the like) to facilitate the transfer of the mash and wort between these various stations.

While the process described above is still used by many brewers to produce sour beer, it may be desirable to provide a different process to improve efficiency and/or product quality.

SUMMARY OF THE INVENTION

As a first aspect, embodiments of the invention are directed to a process for brewing sour beer. The process comprises:
 (a) heating milled grain, water and enzymes to produce a mash; then
 (b) separating malt liquid from mash solids to produce a wort; then
 (c) combining the wort with bioacid in a sour tank and heating the wort to produce a soured wort; then
 (d) transferring the soured wort to a kettle;
 (e) heating the soured wort in the kettle; then (f) removing particulate matter from the soured wort; then
 (g) transferring the soured wort to a cellar.

Producing sour beer via the steps described above, and in particular including a souring step (i.e., step (c) above) that involves frequent circulation/mixing and controlled heat application, can reduce the overall time required to brew sour beer.

As a second aspect, embodiments of the invention are directed to a process for brewing sour beer comprising:
 (a) heating milled grain, water and enzymes to produce a mash; then
 (b) separating malt liquid from mash solids to produce a wort; then
 (c) combining the wort with *Lactobacillus* in a sour tank and heating and recirculating the wort to produce a soured wort; then
 (d) transferring the soured wort to a kettle;
 (e) heating the soured wort in the kettle; then
 (f) removing particulate matter from the soured wort; then
 (g) transferring the soured wort to a fermenter.

As a third aspect, embodiments of the invention are directed to a system for brewing sour beer comprising: a mash tun; a lauter tun fluidly connected with the mash tun; a sour tank operatively associated with a heating device, the sour tank fluidly connected with the lauter tun; a kettle fluidly connected with the sour tank; and a whirlpool fluidly connected with the kettle.

DETAILED DESCRIPTION OF EMBODIMENTS OF THE INVENTION

Figure 1:
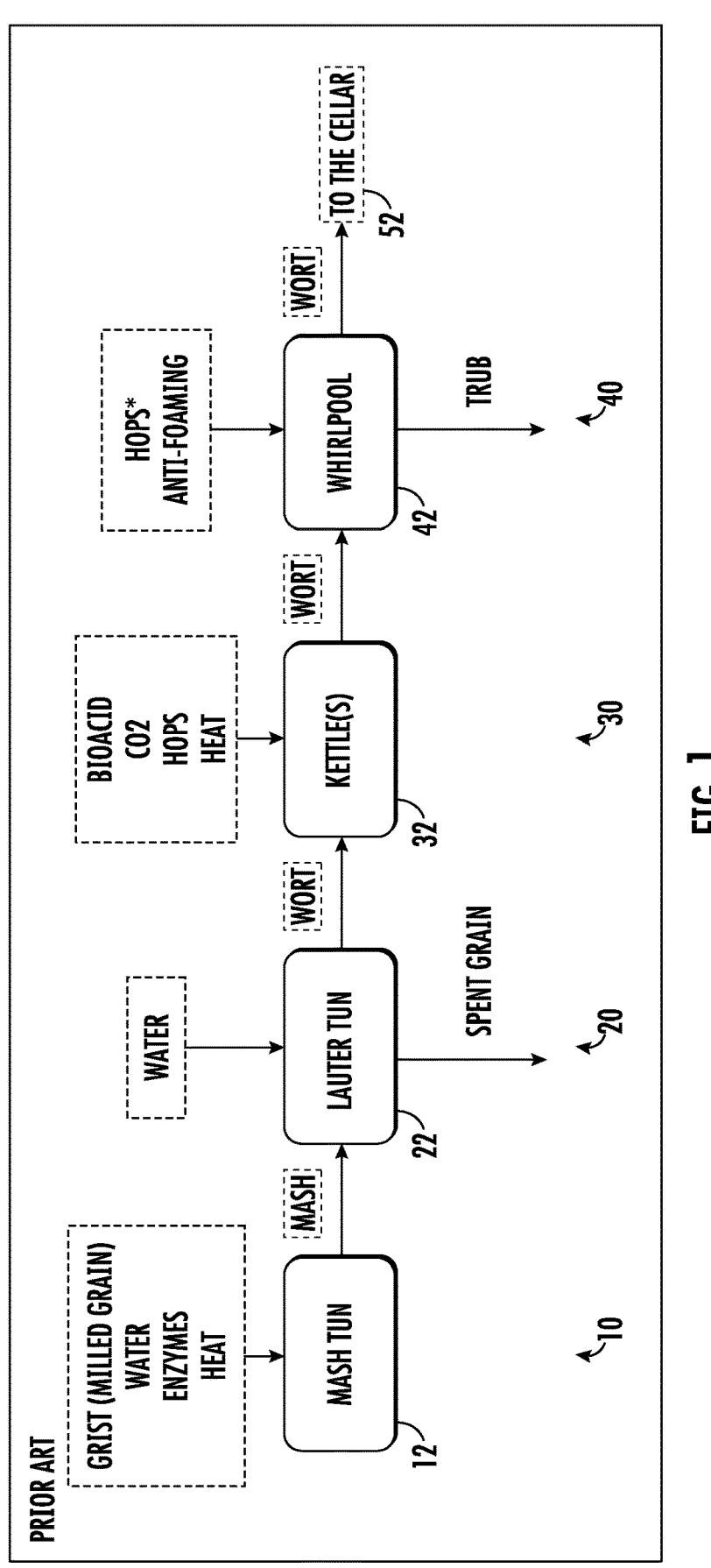
FIG. 1 is a flow chart illustrating conventional operations for a process for brewing sour beer.

The present invention will now be described more fully hereinafter, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout. Thicknesses and dimensions of some components may be exaggerated for clarity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

As used herein, the term "forward" and derivatives thereof refer to the general direction via carriers and via travel as they move from station to station; this term is intended to be synonymous with the term "downstream", which is often used in manufacturing environments to indicate that certain material being acted upon is farther along in the manufacturing process than other material. Conversely, the terms "rearward" and "upstream" and derivatives thereof refer to the directions opposite, respectively, the forward and downstream directions.

Well-known functions or constructions may not be described in detail for brevity and/or clarity.

Figure 2:
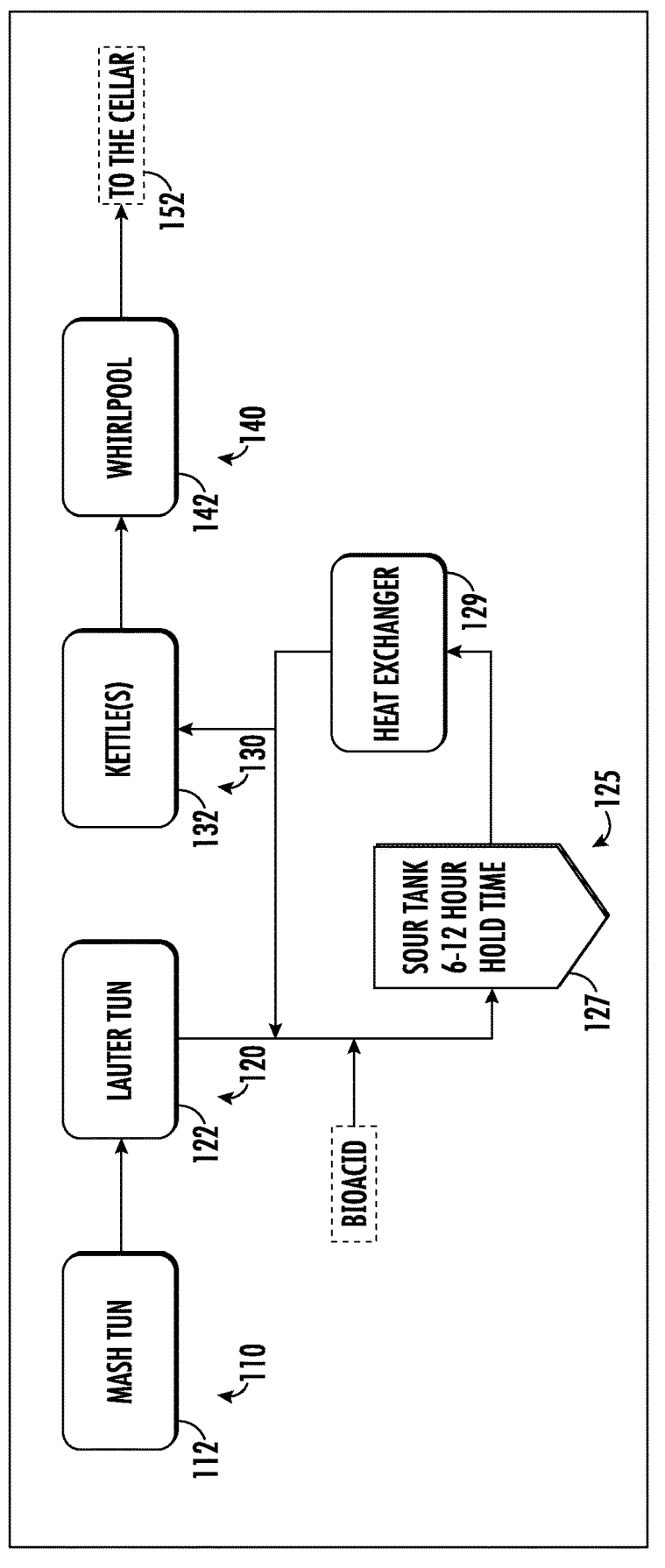
FIG. 2 is a flow chart illustrating operations for a process for brewing sour beer according to embodiments of the invention.

Referring now to FIG. 2, an improved system and process for brewing sour beer are shown therein. The process includes the steps discussed above for conventional sour beer brewing ("kettle souring"): namely the combination of ingredients in the mash tun 112 to produce mash (Block 110); the addition of water and separation of malt liquid from mash solids in the lauter tun 122 to produce wort (Block 120); the addition of ingredients to the wort in the kettle 132 (Block 130); and the processing of wort in the whirlpool 142 (Block 140). However, the process illustrated in FIG. 2 also includes the step of bypassing the wort from the lauter tun 122 to a souring tank 127, adding bioacid to the wort, heating and recirculating the mixture until desired sensory goals are reached (Block 125) prior to transferring the soured wort to the kettle 132. It has been discovered that this step can both reduce the overall brewing time and provide a consistent and repeatable product with the desired sensory outcomes. All of the steps above are described in greater detail below.

The milled grain provided for the mash may be any grain typically known to be suitable for the production of sour beer. The grain is typically ground into a coarse flour (known as "grist"). Exemplary grains include malted and unmalted grains, frequently barley. In some instances, a combination of grain additions may be employed (e.g., wheat or oats). Also, in certain instances the grains may be hydrated to maintain the husks of the grain in a supple, pliable condition; maintaining the husks in an intact condition separate from the endosperm of the grain can produce a less astringent product and aids in lautering.

The grist is introduced into the mash tun 112 and combined therein with warm water (e.g., 110° F.-180° F.) to produce mash (Block 110). In the mash tun 112, the mash undergoes a step process in which the temperature of the mash is raised and held at specific increments to achieve various enzymatic reactions. Heating of the mash can trigger natural enzymatic reactions in the grain; these reactions can include the molecular breakdown or degradation of proteins and carbohydrates in the grain into smaller proteins and sugars. At the conclusion of the mashing process in the mash tun 112, the resulting liquid mash should have the desired balance of sugars and proteins for the resulting beer. Typically, the mash tun 112 is insulated and/or jacketed with steam or hot water to maintain the desired temperature within the vessel.

When mashing is complete, the mash is transferred to the lauter tun 122 (Block 120) to produce wort. In the lauter tun 122, malt liquid of the mash (i.e., the wort) is separated from the mash solids. Hot brewing water (e.g., 180° F.) is introduced to rinse malt sugars from the solids (a process known as "sparging"). A predominantly clear liquid is drained from the lauter tun 122 as wort, and the solids (i.e., the residual grain) are removed and disposed of (e.g., recycled as livestock feed). The lauter tun 122 may have a slotted "false" bottom surface to assist with the separation of the wort from the residual grain, a mash filter may be used, or any other way of separating the residual grain from the wort.

In some embodiments, the wort being produced in the lauter tun 122 is monitored and/or sampled. Exemplary properties of the wort of interest include turbidity, flow rate, and specific gravity. In particular, specific gravity may be used to monitor the concentration of fermentable and unfermentable sugar in the wort.

After the wort is produced in the lauter tun 122, the wort is introduced into the sour tank 127 (Block 125) (although in traditional kettle souring embodiments the souring step may be performed in the kettle 132). Ingredients for the souring step are also introduced into the sour tank 127. Such ingredients include bioacids such as *Lactobacillus*, lactic acid, or acid malt, as well as carbon dioxide. Carbon dioxide is added in a manner that creates an anaerobic environment, which can be crucial for the bioacid to thrive.

In some embodiments, the entire amount of bioacid for souring may be added at once, while in other embodiments the bioacid may be added continuously or intermittently. The bioacid may be added to the wort as it is piped or otherwise conveyed to the sour tank 127, or may be added directly to the sour tank 127. Also, in some embodiments, the $CO_2$ is introduced to the wort outside of the sour tank 127, and may be added in a pulsed fashion.

As shown in FIG. 2, a heat exchanger 129 or other heating device is operatively associated with the sour tank 127 to provide heat to the wort as it sours and control the temperature of the wort in the sour tank. In some embodiments, the temperature of the wort is raised to between about 45° C. to 50° C., with about 48° C. being used for certain embodiments. The wort is recirculated through the heat exchanger 129 and the sour tank 127 for a sufficient duration to increase acidity and thereby provide a sour flavor to the finished product. An exemplary duration for souring of the wort in the sour tank 127 is between about 4 and 14 hours, and in particular between about 6 and 12 hours, depending on souring target and system effectiveness.

Notably, the recirculation of the wort through the process loop that includes the sour tank 127 and the heat exchanger 129 can provide multiple advantages. First, recirculation can encourage mixing of the wort during souring, which can produce a more homogenized product and can accelerate the souring process. Although mixing is shown herein via the recirculation loop between the sour tank 127 and the heat exchanger 129, in some embodiments the mixing/recirculation may be provided by other techniques (e.g., via an agitator). Second, the controlled application of heat during the souring process (particularly continuously applied heat) can accelerate the souring process.

After souring, the soured wort is transferred from the sour tank 127 to the kettle 132 (Block 130). In the kettle 132, the soured wort is boiled and sterilized. Heating of the soured wort helps to kill or neutralize the *Lactobacillus* to prevent over-souring. In some embodiments, hops may be added to the soured wort in the kettle 132; such addition may be performed at different points during boiling to contribute to taste and/or aroma. Other ingredients, such as dextrose, micronutrients, and various other flavoring or process-aid ingredients may also be added to the wort as it is heated in the kettle 132.

Also, in some instances hops may be strained after the wort exits the kettle. Additional hops may be added during straining, and in some instances the hot wort is piped over fresh hops to enhance flavor of the finished product.

After kettling and any straining, the wort is transferred from the kettle 132 to the whirlpool 142 (Block 140), where remaining solids (such as fine hop and protein particles) are removed. In some instances, the wort is pumped into the vessel tangentially, such that a whirlpool is created. This action drives the particles to the bottom center of the vessel. The wort is removed from the vessel and transferred to the cellar 152 or other storage/processing/fermenting facility for further processing. In some embodiments, if whirlpool tanks are not present, the particles may be separated by other means, such as gravity, chemical settling, or centrifuge.

It has been determined that producing sour beer via the steps described above, and in particular including a souring step 125 that involves frequent circulation/mixing and controlled heat application, can reduce the overall time required to brew sour beer. For example, without the aforementioned recirculation and controlled heating, the time required to sour the wort may be 24-72 hours. In contrast, employing a more controlled souring step 125 as described above can reduce the time required to complete the souring step 125, 130 to 5-12 hours. While not wanting to be confined to any theory of operation, it is theorized that the heating performed on the wort as it sours promotes growth of the *Lactobacillus*, which in turn expedites the souring process. It has also been noted that in some instances the taste and texture of the finished product are improved.

Another potential advantage of the above-described process is increased flexibility within the brewhouse. When the wort is being soured in the souring tank 127 during the souring step 125, the kettle 130 is unoccupied, and is therefore free to be used in the preparation of another batch of beer (sour or otherwise). This is in contrast to kettle souring process, in which souring and kettling both occur in the kettle.

Those of skill in this art will appreciate that the above-described steps and equipment may take different forms. For example, although FIG. 2 illustrates that the transferring of the mash, the wort, the soured wort, etc. between the various steps is performed via pipes and the like, in some embodiments one or more of the transferring operations may be performed otherwise (e.g., carrying the entire batch of wort to the sour tank 127 and depositing it all at once or transfer via soft hoses rather than hard piping). As another example, heating of the wort during souring in the sour tank 127 is illustrated as being performed via a heat exchanger; however, in some embodiments a different type of heating process (e.g., direct heat to the sour tank 127) may be employed. Other variations will be apparent to those of skill in this art.

The invention being thus described, it will be apparent that the same may be varied in many ways. Such variations are not to be regarded as a departure from the spirit and scope of the invention, and all such modifications as would be obvious to one skilled in the art are to be included within the scope of the following claims.

That which is claimed is:

1. A process for brewing sour beer, comprising:
 (a) heating milled grain, water and enzymes to produce a mash; then
 (b) separating malt liquid from mash solids to produce a wort; then
 (c) combining the wort with bioacid in a sour tank and heating the wort through a heat exchanger outside of the sour tank to produce a soured wort; then
 (d) transferring the soured wort to a kettle;
 (e) heating the soured wort in the kettle; then
 (f) removing particulate matter from the soured wort; then
 (g) transferring the soured wort to a cellar;
 wherein the bioacid comprises at least one of *Lactobacillus*, lactic acid, or acid malt.

2. The process defined in claim 1, wherein step (a) is performed in a first tank, step (b) is performed in a second tank, and step (f) is performed in a whirlpool.

3. The process defined in claim 2, wherein the first tank is a mash tun, and wherein the second tank is a lauter tun.

4. The process defined in claim 1, wherein step (c) comprises applying and controlling heat to the wort for between about 4 and 14 hours.

5. The process defined in claim 4, wherein step (c) comprises applying heat to the wort for between about 6 and 12 hours.

6. The process defined in claim 1, wherein step (c) comprises applying hear to the wort at a temperature of between about 45° C. and 50° C.

7. The process defined in claim 1, wherein step (c) comprising applying heat to the wort at a temperature of about 48° C.

8. The process defined in claim 1, wherein the bioacid comprises *Lactobacillus*.

9. The process defined in claim 1, wherein step (c) includes introducing carbon dioxide to the wort.

10. The process defined in claim 9, wherein the carbon dioxide is introduced in a pulsing fashion.

11. The process defined in claim 1, wherein step (e) further comprises adding hops to the sour wort.

12. A process for brewing sour beer, comprising:
 (a) heating milled grain, water and enzymes to produce a mash; then
 (b) separating malt liquid from mash solids to produce a wort; then
 (c) combining the wort with *Lactobacillus* in a sour tank and heating and recirculating the wort through a heat exchanger outside of the sour tank to produce a soured wort; then
 (d) transferring the soured wort to a kettle;
 (e) heating the soured wort in the kettle; then
 (f) removing particulate matter from the soured wort; then
 (g) transferring the soured wort to a fermenter.

13. The process defined in claim 12, wherein in step (c) heating and recirculating the wort comprises passing the wort through a heat exchanger outside of the sour tank.

14. The process defined in claim 12, wherein step (c) includes introducing carbon dioxide to the wort.

15. The process defined in claim 14, wherein the carbon dioxide is introduced in a pulsing or continuous fashion.

16. The process defined in claim 12, wherein step (c) is performed for between about 6 and 12 hours at a temperature of about 48° C.

* * * * *